United States Patent Office 3,833,628
Patented Sept. 3, 1974

3,833,628
OIL EXTRACTION PROCESS
Marshall Pike, Camberley, and Alan Watson Routledge, Whitehaven, England, assignors to Albright and Wilson Limited, Oldbury, near Birmingham, England
No Drawing. Filed Sept. 30, 1970, Ser. No. 77,011
Claims priority, application Great Britain, Oct. 2, 1969, 48,586/69
Int. Cl. C09f 5/00
U.S. Cl. 260—412          12 Claims

ABSTRACT OF THE DISCLOSURE

Glyceride oils are extracted from vegetable or fish sources by treatment of the source with an aqueous solution containing an effective amount of a sulphonate salt selected from the group consisting of alkali metal, alkaline earth metal and ammonium salts of phenyl and alkylphenyl sulphonic acids wherein there are not more than 3 alkyl groups comprising not more than 4 carbon atoms in the aggregate, and subsequently separating from a mixture of liquid phase comprising oil and said sulphonate solution and recovering oil from said liquid phase. In preferred cases, e.g. with palm fruit, the source is such that the sulphonate salt treatment brings about the removal of a major proportion of available oil without expressing.

---

The present invention relates to processes of oil extraction from vegetable and fish sources.

A variety of vegetable sources are currently treated to obtain glyceride oils. These include both fruits such as palms and olives and oilseeds such as ground nuts, cocoa beans, cottonseed, corn germs, grapefruitseed, hempseed, linseed, castorseed, mustardseed, rapeseed, robberseed, sunflowerseed, almonds, palm kernels babassu, copra, soyabeans, coconuts and apricot kernels. Fish sources are usually herrings, sardines or menhaden.

The processes used to recover glyceride oil from sources such as aforesaid are basically similar although varying in detail. Palm fruits are generally sterilised, usually with steam, threshed to loosen the fruit from the bunches and digested, say at 95° C., prior to being crushed or pressed using a hydraulic or screw press. In an alternative procedure the oil is separated by steaming the fruit in a basket centrifuge. In either case the liberated oil is then processed by procedures such as clarification, centrifugation and drying to give a final product. From the residue palm kernels are separated and crushed to give palm kernel oil. The remaining fibrous residue separated from free oil is normally burnt although it may still contain appreciable quantities of absorbed oil, possibly up to 9% by weight.

Olive oil is obtained by crushing olives, usually without any prior sterilising or threshing. The residue after pressing commonly still contains 8-10% of oil which may be recovered by solvent extraction.

The usual processing methods applied to oilseed sources commence with decortication, possibly after cleaning or sterilising. The decorticated seeds are normally then reduced to small particles or flakes and cooked in order both to break down the oil-bearing sacs in the oilseed and to adjust the moisture content of the seed to give a suitable plasticity for pressing. In some cases, e.g. with castorseeds, the cooking may be omitted. Glyceride oil is then recovered from the cooked material either by expression or by solvent extraction. Where the residual expressed product, or "cake," is to be used as a human or animal foodstuff it is necessary to ensure that it has a certain nutritional value. In terms of material utilisation this is most efficiently done by expressing as much oil as possible from the cake and subsequently making up the nutritional value by specific addition of materials refined from the oil, such as fatty acids. However in many cases plant capabilities are such that the residual cake must inevitably contain a certain quantity of absorbed residual oil and in such instances this itself may be enough to achieve the required nutritional value.

Fish sources are generally chopped or minced and cooked at about 100° C. for a closely specified period before being transferred to a press or a decantation centrifuge. There a liquid phase consisting of about 80% water and 20% oil is removed. This is then centrifuged to separate the phases, the oil phase being subsequently refined by appropriate means and the aqueous phase either discarded or concentrated for blending back with the solid residue from oil removal the so called fish "meal." This may find use as either human or animal fodder, depending upon its oil content. The lower the oil content the better the quality of the meal. There is some difficulty in removing the residual oil from the meal and to date no large scale process has in fact been developed which will produce meal of a low enough oil content to be suitable for human consumption. It has been suggested that this may be achieved by using a solvent extraction procedure instead of expression or decantation.

Thus existing processes for extraction of vegetable and fish oil suffer from the disadvantage that a substantial proportion of the oil is not recovered but is left on or in the residue of expression. The problem may be overcome by the use of solvent extraction to supplement or replace the expression stage but this is elaborate and expensive, mainly because of the need to recycle solvent, and is also hazardous.

The present invention provides a method of improving the yield of oil extracted from vegetable and fish sources in processes such as aforesaid. This is done by treating the material with a concentrated solution of an alkali metal, alkaline earth metal or ammonium salt of a lower alkyl phenyl sulphonic acid. That this improves the extraction of oil is surprising since the sulphonate salts used are known in glyceride oil refining as agents which have the advantage of *not* dissolving or emulsifying glyceride oil. They have, moreover, exceedingly weak surfactant properties and find little, if any, use as wetting agents. It may be that the sulphonate salt functions by weakening the retaining power of the solid material for the oil, enabling the latter to be floated off by the physical washing action of the sulphonate solution but we are uncertain of the actual mechanism of this effect. In some cases the sulphonate salt solution also appears to be able to break down the cell structure of undigested raw materials so as to liberate oil.

Accordingly, the present invention provides a process of extracting oil from a vegetable or fish raw material which comprises treating the raw material with an aqueous solution containing an effective amount of an alkali metal, alkaline earth metal or ammonium salt of phenyl or a lower alkylphenyl sulphonic acid wherein there are not more than 3 alkyl groups containing not more than 4 carbon atoms in the aggregate; subsequently recovering a liquid mixture of oil and aqueous sulphonate solution phase and separating the oil phase therefrom.

The vegetable or fish raw material may be derived from any type of vegetable or fish at present used as a source of oil, for example such as aforementioned. Before being treated with the slphonate salt the raw material will normally have been subjected to a preliminary processing which, depending upon the nature of the plant and the original vegetable or fish source, may comprise any or all of the steps which would normally be applied in a conventional extraction procedure. Likewise after addition of the sulphonate solution the raw material may be subjected to a number of conventional processing steps before oil is separated. In general however, two main types of process may be distinguished; those in which the sulphonate salt solution is present during the pressing of the raw material in order to increase the yield from the main extraction stage and those in which the raw material is one which has already been pressed to expel the bulk of its oil, e.g. crushed palm fibres or olives, pressed seed cake or fish meal.

Where the sulphonate salt solution is to be present during a pressing stage it may be convenient to add it either just prior to the pressing or before a preceding stage in a processing operation. Thus in the case of "fruits" such as palm fruit the sulphonate solution may be added just prior to any of the steps of sterilisation, threshing and digestion which precede the pressing. In the case of oil-seeds and fish the sulphonate solution will usually be added after any cooking step but in some cases it may be desirable to add it beforehand.

In cases where the novel process is applied to a crushed residue the latter may be material obtained by any conventional extraction process but because of the efficiency of the sulphonate salt in removing oil it will often be found advantageous to permit the crushed raw material to contain an oil content appreciably higher than in corresponding conventional processes. In this event the pressure exerted by the press and the consequent adiabatic heating and degradation of the oil may be reduced. In the extreme case it may be found economic to subject a raw material to only a mild pressing so as to express only the most readily liberated oil and subject the oil-rich residue to the sulphonate salt treatment.

We have also discovered that in some cases the sulphonate salt solution itself encourages the liberation of oil even without any expression treatment. This appears to be a direct influence of the sulphonate solution in breaking down the pericarpal oil-bearing cells of the raw material. This may be a further factor permitting the pressure of the expressing to be very much reduced. In some cases, notably with palm fruit, it may be possible to dispense with the expressing stage altogether provided a sufficiently long treatment time is used. This surprising result represents a further valuable advantage of the invention. Other raw materials with which the sulphonate salt treatment may allow the expressing pressure to be reduced include cocoa beans and fish. Processes wherein a raw material which has not been treated in a press is treated with an effective amount of a solution of a sulphonate salt, as hereinbefore defined, and the treated product is then filtered to provide a filtrate comprising a major proportion of the oil originally present in the raw material constitute further aspects of this invention. The unpressed raw material is preferably palm fruit which has most preferably been threshed or agitated so as to break the skin of the fruit and, possibly, digested. Advantageously the sulphonate salt may be present during digestition in which case sufficient breakdown of the raw material may occur in the digester itself to enable a major yield of oil to be obtained by filtration of the digestate without any preliminary pressing or crushing.

The sulphonate salt is preferably of an alkali metal, most conveniently sodium. The most preferred salts are those of benzene, toluene, xylene, cumene and cymene sulphonic acids, especially sodium toluene sulphonate and sodium xylene sulphonate most particularly sodium xylene sulphonate.

Other possible sulphonates are those derived from the sulphonic acids of hemimellitene; pseudocumene; mesitylene; ethylbenzene; n-propylbenzene; n-butylbenzene and tert-butylbenzene. It is to be noted that these materials have little or no utility as surfactants for normal dispersing and emulsifying applications and are therefore to be distinguished from common sulphonate surfactants such as sodium dodecyl benzene sulphonate.

The quantity of sulphonate salt used may vary within wide limits, depending upon the difficulty of oil removal from the particular raw material, the duration of the treatment and the thoroughness of contacting and the degree of division of the raw material, the necessary quantity usually being greater for less finely divided raw materials. A suitable quantity of sulphonate salt may readily be established experimentally for any particular process. The quantity used will generally be in the range 0.025–50% by weight of dry sulphonate salt based on the weight of raw material to which the salt is added. Usually at least 0.05% is added and for palm fruit a value of 0.125 is generally the minimum. Also it will not normally be necessary to use a quantity of sulphonate salt greater than 10% and we have generally found quantities in the range 0.25–2%, preferably 0.25–1% to give best results although where the raw material is or becomes very finely divided during processing lower quantities, e.g. as with fish where 0.025–0.5% may be found appropriate (all the foregoing figures are expressed as weight of dry sulphonate salt on the weight of raw material).

To conserve plant capacity it will normally be desired to employ as small a quantity of water as will give a conveniently handable aqueous phase during agitation and separation. In most cases this means that a quantity of from 20 to 30 parts by weight, say approximately 25 parts, of water per 100 parts by weight of raw material will be used. In some cases it may be possible to manage with as little as 10 parts on the same basis. These figures include any water liberated from the fruit itself during treatment.

The treatment with sulphonate solution will normally be carried out at elevated temperatures to increase the mobility of the oil and facilitate mixing. It will often be possible to operate at temperatures lower than those used in previous processes especially in cases where the sulphonate has an effect in breaking down the oil-bearing cells of the raw material as with palm fruit. This represents a further advantage of the invention in that it tends to reduce the degradation of the oil product arising from the use of elevated processing temperatures. The treatment itself may be carried out by conventional means such as by mixing the materials in a vessel with agitation or by spraying a solution of the sulphonate over a raw material source on a grid or conveyor. In the latter case the raw material source will preferably be already digested.

After processing the mixture of oil and sulphonate salt solution obtained may be filtered or centrifuged free from residual solid material and may readily be separated into oil and aqueous phases by further centrifuging or by being allowed to stand in a holding vessel until the phases disengage. The oil produced may be water-washed to remove traces of sulphonate, and further treated by customary procedures e.g. clarification, drying and bleaching. The invention is illustrated by the following examples:

EXAMPLE 1

1000 g. of herrings (6 whole fish) were simmered in a saucepan with 50 mls. of 1% sodium xylene sulphonate solution for 30 minutes, with intermittent mashing. The product was placed in a cloth bag and pressed at a pressure rising over 20 minutes to 3000 lbs./sq. inch and about 100° C. About 500 mls. of liquid phase were expressed. This was allowed to separate in a separating funnel at 85° C. into an oily layer and an aqueous layer. The latter was discarded and oily layer repeatedly washed with water. A clear product having an acid value of 2.6 milliequivalents KOH per gram was obtained.

The residue of expression was dried at 100° C. and its residual oil content measured by subjecting standard portions to a Soxhlet extraction with ether and weighing the residue remaining after evaporation of ether from the extract. The expressed residue contained 8.0% of oil, based on the dried material.

EXAMPLE 2

1000 g. of herrings were treated by a process analogous to that of Example 1 save that the sodium xylene sulphonate solution had a concentration of 2% rather than 1%. The oil product had an acid value of 2.9 milliequivalents KOH per gram and the oil content of the expressed residue was 11.5% based on the dried material.

EXAMPLE 3

In a series of extraction approximately 100 g. samples of fresh imported palm oil fruit were placed in a metal container with varying quantities of water and heated to 95° C. on a hot plate. The mixtures were maintained at this temperature for 45 minutes with vigorous stirring by a mechanical stirrer, simulating a threshing action. This caused the fruit to be broken open. Varying quantities of sodium xylene sulphonate were then added and stirring continued for a further 30 minutes. The product was a slurry of aqueous and oily phases with kernels and fibrous residue. This slurry was decanted into a separating funnel and the residue washed thoroughly with several approximately 10 mls. portions of boiling water using a high speed mixer in order to remove residual oil. The washings were successively decanted into the separating funnel which was then held at 90° C. overnight to allow aqueous and oil phases to disengage. The oil phase was separated and centrifuged free of remaining water to give an oil product. The fibrous residue was dried at 100° C. and extracted with ether in a Soxhlot thimble. The extract was evaporated free from ether and weighed. A number of extractions were performed using sodium xylene sulphonate at varying concentrations on the original fruit and varying amounts of water as well as a comparative example using no sodium xylene sulphonate. Results are given in Table I

TABLE I

Residual oil on palm fruit after extraction with varying concentrations of sodium xylene sulphonate. All weights expressed in grams:

| | Weight of— | | |
|---|---|---|---|
| Fruit taken | Water added | Sodium xylene sulphonate added | Oil found in residue after extraction |
| 99.95 | 100 | 25.0 | 2.79 |
| 99.29 | 100 | 10.0 | 2.96 |
| 100.67 | 25 | 0.25 | 1.96 |
| 99.27 | 25 | 0.25 | 2.05 |
| 99.62 | 25 | 1.0 | 1.17 |
| 100.0 | 25 | 0.125 | 4.6 |
| 100.0 | 25 | 0 | 7.61 |

The quality of the oil obtained in the first extraction recorded in Table I (25.0 g. sodium xylene sulphonate) was evaluated by a number of standard tests as follows:

Free fatty acid content (by filtration) as palmitic acid: 4.79% w./w.
Bleachability: (The oil was heated at 300° C. for 30 minutes under nitrogen and its colour evaluated using a standard "Lovibond" tintometer with a 1 inch cell), 0.7 Red. 3 Yellow.
Peroxide Value (by the AOCS official method Cd (8–53) 960): 0.02 milliequivalents per 1000 g.
Concentration of oxidised material: The UV absorbance at 270 m$\mu$ and 235 m$\mu$ was determined using a 0.25% solution of the oil in hexane with 1 cm. cells in a Perkin-Elmer Model 124 UV spectrophotometer. A 0.25% w./w. hexane was used as a blank. UV absorbance at 270 m$\mu$: 13; at 235 m$\mu$: 22.

The quality of the product compared favourably with that normally obtained with a typical crude palm oil in all but the free fatty acid content, the high value of which was attributable to protracted storage during importation.

EXAMPLE 4

23 kgs. of palm oil fruit and 6 kgs. of water were mixed together with 0.25% by weight of sodium xylene sulphonate, based in the fruit, in a high speed mixer at 55° C. The mixing, which simulated a threshing action, was considerable and caused the fruit to be broken open. After 5 minutes mixing the product was allowed to settle and the liquid material decanted off and centrifuged to give an oil product. The fibrous residue was filtered free from liquid and dried, without washing. The absorbed oil content of the dried residue was determined by the method described in example 3 and found to be 2.09% by weight on the dried residue.

The oil product analysed for free fatty acid, peroxide and oxidized material (tests as in Example 3) as follows:

Free fatty acid as palmitic—3.2% by weight
Peroxide (milliequivalents per kg.). 0.00
UV absorbance at 270 m$\mu$—0.0; at 235 m$\mu$—0.0.

EXAMPLE 5

100 g. of flasked palm kernels, 300 mls. of water and 25 g. sodium xylene sulphonate were stirred for 1 hour at 98° C. The mouth of the container was covered with aluminium foil to prevent evaporation loss. The product was then decanted into a separating funnel and the residue washed thoroughly in a high-speed mixer with two 300 ml. portions of boiling water. The washings were combined with the liquid in the separating funnel which was then held at 90° C. for two hours and separated into aqueous and oil phases. The latter phase was centrifuged free from residual water to give an oil product which weighed 19.6 g. The solid residue from the extraction was dried and its residual absorbed oil content found to be 11.0 g., using the Soxhlet extraction method described in Example 3.

We claim:

1. In a process of glyceride oil extraction from the vegtable or fish raw material the improvement which consists in
   (1) admixing said raw material with an aqueous sulphonate solution containing a sulphonate salt selected from the group consisting of alkali metal, alkaline earth metal and ammonium salts of phenyl and alkylphenyl sulphonic acids wherein there are not more than 3 alkyl groups comprising not more than 4 carbon atoms in the aggregate thereby forming (i) a two phase liquid material containing an oil phase and a separate aqueous phase containing said sulphonate salt, and (ii) a solid residue of said raw material;
   (2) separating said liquid material (i) from said solid residue (ii);
      said aqueous sulphonate solution containing said sulphonate salt in an amount between 0.25% and 1% by weight based on the weight of said raw material and between 10 and 25 parts of water per 100 parts of said raw material thereby providing sufficient water to provide an aqueous phase during the operation (2); and
   (3) separating said oil phase from said liquid material (i).

2. A process as claimed in claim 1 where the said sulphonate salt is a sodium salt of a sulphonic acid selected from the group consisting of the sulphonic acids of benzene, toluene, xylene, cumene and cymene.

3. A process as claimed in claim 1 wherein the admixture of said raw material and said aqueous sulphonate solution is pressed to form said liquid material and said solid residue.

4. A process as claimed in claim 1 wherein said raw material had already been pressed to expel oil therefrom before admixture with said aqueous sulphonate solution.

5. A process as claimed in claim 1 wherein said raw material has not been treated in a press and wherein said liquid material is separated by filtration from said solid residue.

6. A process as claimed in claim 5 wherein said raw material is vegetable and has been threshed.

7. A process as claimed in claim 1 wherein said raw material is derived from palm fruit.

8. A process as claimed in claim 1 wherein said raw material is derived from fish.

9. A process for extracting glyceride oil from a vegetable or fish raw material which comprises (1) pressing said raw material to expel oil therefrom and to form a solid residue and separating said oil from said residue; (2) admixing said residue with an aqueous solution of a sodium salt of a sulphonic acid selected from the group consisting of the sulphonic acids of benzene, toluene, xylene, cumene and cymene, the weight of said sulphonate salt used, based on the weight of said raw material, being from 0.25% to 1% and the amount of water in said solution being from 10 to 25 parts per 100 parts of said residue, whereby additional oil is extracted from said residue thereby forming (i) a two phase liquid material containing an oil phase and a separate aqueous phase containing said sulphonate salt, and (ii) a solid residue from which additional oil had been extracted; (3) separating said liquid material from said solid residue from which additional oil had been extracted; and (4) separating said oil phase from said liquid material (i).

10. A process as claimed in claim 9 wherein said raw material is threshed prior to admixture with said aqueous sulphonate solution, and said aqueous sulphonate solution is admixed with said threshed raw material.

11. A process as claimed in claim 10 wherein said raw material is derived from fish.

12. A process as claimed in claim 10 wherein said raw material is derived from palm fruit.

References Cited

UNITED STATES PATENTS

| 1,094,430 | 4/1914 | Epler | 260—412 |
| 1,909,676 | 5/1933 | Henshall | 260—412 |

FOREIGN PATENTS

| 102,241 | 8/1955 | Russia | 260—412 |

JOHNNIE R. BROWN, Primary Examiner